United States Patent
Chen (10) Patent No.: US 10,977,050 B2
(45) Date of Patent: Apr. 13, 2021

(54) METHOD FOR MANAGING SYSTEM BOOT CODE MEMORY, MEMORY DEVICE AND ELECTRONIC SYSTEM USING THE SAME

(71) Applicant: MACRONIX INTERNATIONAL CO., LTD., Hsinchu (TW)

(72) Inventor: Chih-Liang Chen, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 178 days.

(21) Appl. No.: 16/242,298

(22) Filed: Jan. 8, 2019

(65) Prior Publication Data

US 2019/0213012 A1 Jul. 11, 2019

Related U.S. Application Data

(63) Continuation-in-part of application No. 15/868,896, filed on Jan. 11, 2018, now Pat. No. 10,445,088.

(51) Int. Cl.
*G06F 1/24* (2006.01)
*G06F 9/00* (2006.01)
(Continued)

(52) U.S. Cl.
CPC .............. *G06F 9/441* (2013.01); *G06F 8/654* (2018.02); *G06F 9/4401* (2013.01); *G06F 9/4406* (2013.01); *G06F 9/44505* (2013.01); *G06F 12/0646* (2013.01); *G06F 2212/1008* (2013.01); *G06F 2212/202* (2013.01)

(58) Field of Classification Search
CPC .... G06F 9/441; G06F 9/4401; G06F 9/44505; G06F 9/4406; G06F 8/654; G06F 12/0646; G06F 2212/202; G06F 2212/1008
See application file for complete search history.

(56) References Cited

U.S. PATENT DOCUMENTS 6,473,856 B1 10/2002 Goodwin et al.
6,757,838 B1 6/2004 Chaiken et al.
(Continued)

OTHER PUBLICATIONS

TIPO Office Action dated Jan. 16, 2019 in Taiwan application (No. 107109176).
(Continued)

*Primary Examiner* — Xuxing Chen
(74) *Attorney, Agent, or Firm* — McClure, Qualey & Rodack, LLP (57) ABSTRACT

A memory device includes: a non-volatile memory having a first portion and a second portion which are utilized by a current configuration among a first configuration and a second configuration, a primary booting code is stored in one of the first portion and the second portion, and a backup booting code is stored in the other of the first portion and the second portion. In response that a updated booting code replaces the backup booting code, the updated booting code are performed by a prequalify operation, and the first portion and the second portion being temporarily utilized by another configuration, other than the current configuration, among the first configuration and the second configuration. If the updated booting code is operated successfully, after system reset, the first portion and the second portion being utilized by another configuration among the first configuration and the second configuration.

18 Claims, 5 Drawing Sheets

(51) Int. Cl.
  *G06F 9/4401* (2018.01)
  *G06F 8/654* (2018.01)
  *G06F 12/06* (2006.01)
  *G06F 9/445* (2018.01)

(56) References Cited

U.S. PATENT DOCUMENTS

| | | |
|---|---|---|
| 8,397,039 B2 | 3/2013 | Dhakras et al. |
| 9,003,000 B2 | 4/2015 | Currid et al. |
| 2007/0169098 A1* | 7/2007 | Kikuchi .............. G06F 11/1433 717/168 |
| 2008/0141016 A1 | 6/2008 | Chang et al. |
| 2009/0222650 A1* | 9/2009 | Chen ........................ G06F 8/65 713/1 |
| 2013/0167134 A1* | 6/2013 | Shim ....................... G06F 8/654 717/173 |
| 2014/0089561 A1 | 3/2014 | Pangal et al. |
| 2018/0267793 A1* | 9/2018 | Watanabe ............. G06F 3/0659 |
| 2020/0249934 A1* | 8/2020 | Escofet Via ............ G06F 8/656 |

OTHER PUBLICATIONS

TW Office Action dated Aug. 6, 2020 in Taiwan application (No. 108100560).

* cited by examiner

METHOD FOR MANAGING SYSTEM BOOT CODE MEMORY, MEMORY DEVICE AND ELECTRONIC SYSTEM USING THE SAME

CROSS-REFERENCE TO RELATED ART

This application is a continuation-in-part of U.S. application Ser. No. 15/868,896, filed on Jan. 11, 2018, the disclosure of which is incorporated by reference herein in its entirety.

BACKGROUND

Field

The present invention relates to a method for managing system boot code memory, a memory device and an electronic system using the same. In particular, the present technology pertains to managing and upgrading code, such as a Basic Input/Output System (BIOS) stored in non-volatile memory.

Description of Related Art

Typically, when a computer system is first turned on or rebooted, the first piece of software that is executed is system boot code, such as a Basic Input/Output System (BIOS), that is stored in non-volatile memory. When the boot code is executed, it will usually run a self-test and a system-test on the computer system. The boot code also includes functions (executable code) for initializing and controlling the basic components of the computer system, such as the keyboard, the display, various disk drives (e.g., hard-disk drive, floppy disk drive, CD-ROM drive, DVD drive, etc.), and various communication ports, such as serial ports (e.g., the universal serial bus, etc.). The boot code can initialize a boot loader that will load the operating system from the appropriately selected disk drive. A computer system cannot boot up without valid and functional boot code.

Boot code is normally stored in non-volatile memory so that it is not erased every time the computer system reboots and so that it can be updated over time as new features are enabled, as the efficiency or functionality of the boot code is improved, or as bugs are fixed in the original boot code. Over time the ability to update the boot code has become much easier. For example, many computer systems are equipped with the functionality to upgrade themselves when new boot code is available by downloading a new version of the boot code over the internet.

Because of the critical nature of boot code, it is not safe to erase the current boot code and download a new version or just begin writing over the existing boot code without taking precautionary measures. This is because of the chance of a power failure or a system failure or the chance of downloading corrupted data. Without safety precautions in place, a user could be in a position where their existing boot code is fully or partially erased and the updated boot code is not available for execution. The result would be that their computer system would not properly boot up. As a result, to make the process of maintaining and updating boot code, conventional computer systems have implemented Dual-BIOS or TwinBIOS systems that allow a newer version of boot code to be downloaded to a separate backup flash memory while retaining the existing (i.e., currently working) boot code in the main BIOS flash memory. For example, conventional computer systems include a motherboard with a main BIOS (boot code) flash memory and a backup BIOS (boot code) flash memory (note that the "main BIOS flash memory" and the "backup BIOS flash memory" are used to indicate that there are two different flash memories that are dedicated to storing boot code, or other types of data). These DualBIOS or TwinBIOS systems download the new boot code into the backup flash memory. Once the new boot code is fully downloaded and validated, then the computer system would either copy the new boot code into the main flash memory for the next boot cycle or would boot from the backup flash memory on the next boot cycle. With this architecture, the DualBIOS or TwinBIOS systems are also able to keep backup copies of the currently working boot code, so that in the event of corruption of the main boot code as a result of a virus, a power surge or a sudden power failure, the backup boot code can be executed at the next power cycle. Typically, the boot code in the main flash memory will be evaluated at boot up and if the boot code fails the evaluation, then the boot code will be executed from the backup flash memory.

These conventional systems require two separate flash memories to be dedicated to storing, updating and executing boot code. The use of two separate flash memories requires the use of additional area on motherboards. Recently, the types of computer systems using boot code and requiring boot code updates are not just limited to personal or desktop computers, but they extend to wearable devices, set-top boxes, media center receivers, Internet-of-Things devices, home appliances, automotive components, servers, data centers, to name a few, where space constraints are of the utmost concern.

Therefore, it is desirable to provide a method for managing system boot code memory, a memory device and an electronic system using the same which improve disadvantages of the conventional arts.

SUMMARY

In one aspect of the present technology a memory device is provided. The memory device includes: a non-volatile memory configured by having a first portion and a second portion, wherein: the first portion is represented by a first range of physical addresses, the second portion is represented by a second range of physical addresses, the first portion and the second portion are utilized by a current configuration among a first configuration and a second configuration, a primary booting code is stored in one of the first portion and the second portion and a backup booting code is stored in the other of the first portion and the second portion; an address decoder coupled to the non-volatile memory, for mapping received command addresses to physical addresses of the non-volatile memory; and a control circuitry coupled to the address decoder. In response that a updated booting code replaces the backup booting code, the updated booting code are performed by a prequalify operation, and the first portion and the second portion being temporarily utilized by another configuration, other than the current configuration, among the first configuration and the second configuration. If the updated booting code is operated successfully, after system reset, the first portion and the second portion being utilized by another configuration among the first configuration and the second configuration. If the updated booting code is not operated successfully, after system power off-on cycle, the first portion and the second portion being utilized by the current configuration among the first configuration and the second configuration.

In another aspect of the present technology, a method for managing system boot code memory applied in a non-volatile memory is provided. The non-volatile memory is configured by having a first portion and a second portion, the first portion is represented by a first range of physical addresses, the second portion is represented by a second range of physical addresses, the first portion and the second portion are utilized by a current configuration among a first configuration and a second configuration, a primary booting code is stored in one of the first portion and the second portion and a backup booting code is stored in the other of the first portion and the second portion. The method includes: in response that a updated booting code replaces the backup booting code, performing a prequalify operation on the updated booting code, wherein the first portion and the second portion being temporarily utilized by another configuration, other than the current configuration, among the first configuration and the second configuration; if the updated booting code is operated successfully, after system reset, utilizing the first portion and the second portion by another configuration among the first configuration and the second configuration; and if the updated booting code is not operated successfully, after system power off-on cycle, utilizing the first portion and the second portion by the current configuration among the first configuration and the second configuration.

In another aspect of the present technology, provided is an electronic system, comprising: a host; and a memory device coupled to the host. The memory device includes: a non-volatile memory configured by having a first portion and a second portion, wherein: the first portion is represented by a first range of physical addresses, the second portion is represented by a second range of physical addresses, the first portion and the second portion are utilized by a current configuration among a first configuration and a second configuration, a primary booting code is stored in one of the first portion and the second portion and a backup booting code is stored in the other of the first portion and the second portion; an address decoder coupled to the non-volatile memory, for mapping received command addresses to physical addresses of the non-volatile memory; and a control circuitry coupled to the address decoder. In response that a updated booting code replaces the backup booting code, the updated booting code are performed by a prequalify operation, and the first portion and the second portion being temporarily utilized by another configuration, other than the current configuration, among the first configuration and the second configuration. If the updated booting code is operated successfully, after system reset, the first portion and the second portion being utilized by another configuration among the first configuration and the second configuration. If the updated booting code is not operated successfully, after system power off-on cycle, the first portion and the second portion being utilized by the current configuration among the first configuration and the second configuration.

Other aspects and advantages of the present invention can be seen on review of the drawings, the detailed description and the claims, which follow.

DETAILED DESCRIPTION

A detailed description of embodiments of the present invention is provided with reference to the attached Figures.

Figure 1:
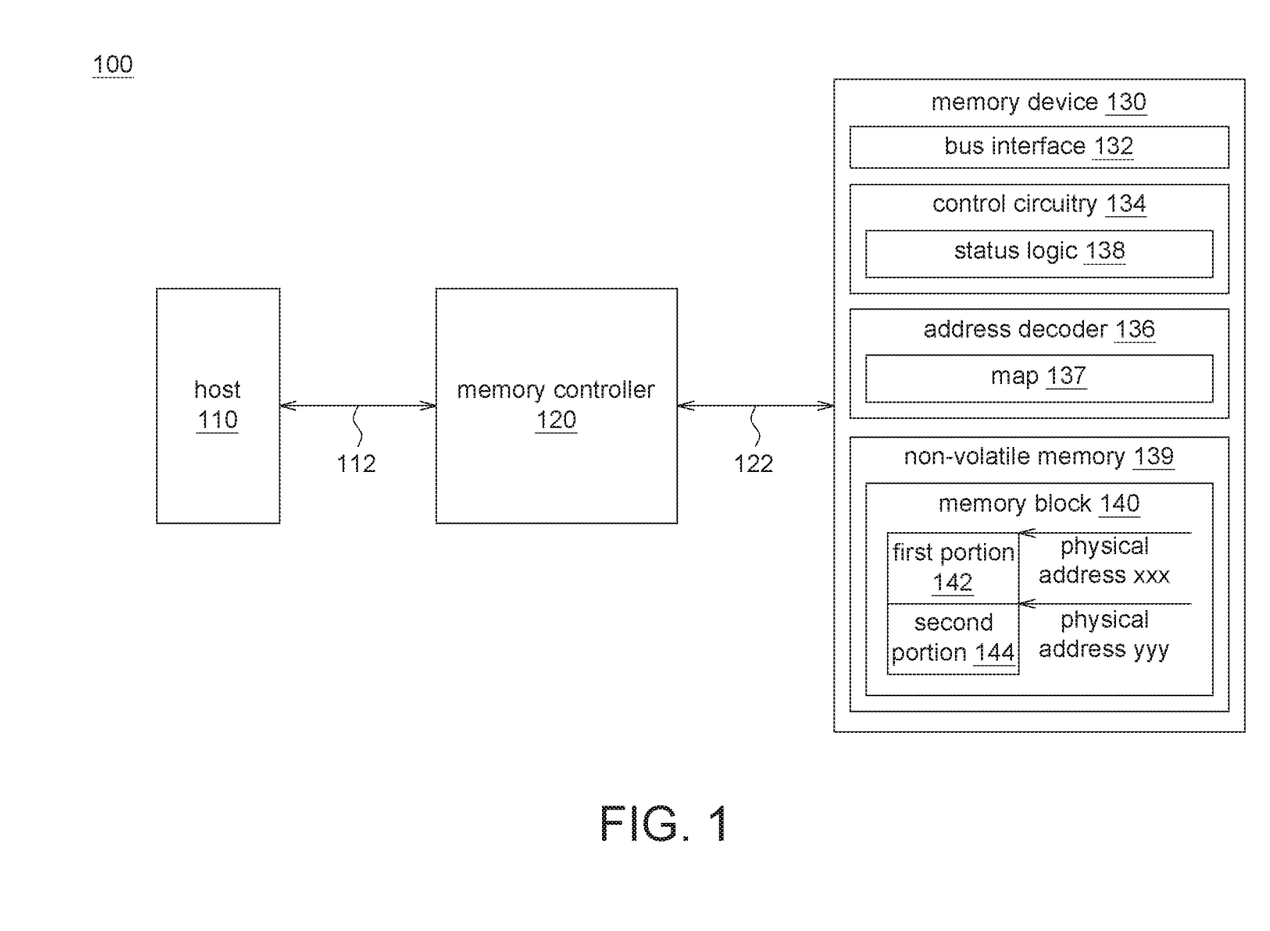
FIG. 1 illustrates a functional block diagram of an electronic system according to an exemplary embodiment of the application.

FIG. 1 illustrates a functional block diagram of an electronic system according to an exemplary embodiment of the application. The system (i.e. the electronic system) 100 includes a host 110, a communication bus 112, a memory controller 120, a communication bus 122 and a memory device 130. In system 100, the host 110 executes programs that read and write data using logical addresses. The host 110 communicates across the communication bus 112 to the memory controller 120 and the memory controller 120 communicates across the communication bus 122 to the memory device 130.

The host 110, for example, can be a computer system running an operating system that delivers requests (e.g., write and read) to the memory controller 120 through the communication bus 112.

The communication bus 112 between the host 110 and the memory controller 120 can be, for example, a peripheral component interconnect (PCI) bus, a peripheral component interconnect express (PCIe) bus, a serial ATA (SATA, Serial Advanced Technology Attachment), and any other type of bus that communicates using appropriate communication protocols.

The memory controller 120 can be implemented using software or other logic structures in a microcontroller unit (MCU) or a dedicated memory controller chip. In other embodiments, the host 110 and memory controller 120 can be implemented on a single processor, or the host 110 and memory controller 120 can be parts of a complex data processing system. The memory controller 120 can act as an interface between the host 110 and the memory device 130. One function of the memory controller 120 is to translate higher-level read and write requests into the command language of the particular memory device 130 that can be used to access non-volatile memory 139 included on the memory device 130.

The memory controller 120 is connected to the memory device 130 by the communication bus 122. For the purpose of this description, the communication bus 122 can be a communication system that transfers data between the memory controller 120 and the memory device 130. The communication bus 122 can include bus lines connected to the memory controller 120 and the memory device 130.

The memory device 130 includes a bus interface 132, control circuitry 134, an address decoder 136, and non-volatile memory 139. The non-volatile memory 139 of the memory device 130 can be a single-bit-per-cell or multiple-bit-per-cell NOR non-volatile flash memory device. In other examples, the non-volatile memory 139 can comprise other types of non-volatile memory devices, including single-bit-per-cell or multiple-bit-per-cell NAND flash, phase change memory, magnetic memory, metal oxide programmable resistance memory and so on.

Further, the non-volatile memory 139 can be configured with a plurality of memory blocks 140 to which read and write operations are performed. For example, as illustrated in FIG. 1, blocks 140 of the non-volatile memory 139 can include a first portion 142 and a second portion 144. For example, the first portion 142 can represent a continuous range of physical addresses starting from a certain address xxx (e.g., address 000000h) and the second portion 144 can represent another continuous range of addresses starting from a certain address yyy (e.g., address 800000h). The second portion 144 can start at the next physical address immediately following the end of the first portion 142 or there can be extra space allocated between the first portion 142 and the second portion 144, which could be reserved for other uses or could be reserved for expanding the range of the first portion 142 and/or the second portion 144.

The address decoder 136 of the memory device 130 includes a map 137 and the control circuitry 134 includes status logic 138. The map 137 maps command addresses (e.g., read command addresses and write command addresses) received from the memory controller 120 to physical addresses of the non-volatile memory 139. The status logic 138 can be used to indicate to the map 137 which one of the first portion 142 and the second portion 144 is to be read from and written to. The control circuitry 134 and/or the status logic 138 can determine and indicate that the memory device 130 is operating in a normal mode or a dual-area update mode in which both the first portion 142 and the second portion 144 are used for storing and updating code (e.g. boot code).

The control circuitry 134, which includes status logic 138, accesses the non-volatile memory 139, executes memory read and write operations and maintains a current status that is used to determine which portion (e.g., the first portion 142 or the second portion 144) of the non-volatile memory 139 should be used/accessed. In an implementation, the first portion 142 and the second portion 144 are used to store the BIOS or boot code.

The control circuitry 134 also decodes the command sequences received on the bus interface 132 from the memory controller 120. These command sequences can include corresponding operation codes, such as read, write, erase, etc., the command addresses and/or data, such as the data to be written to the non-volatile memory 139. The control circuitry 134 executes an updating operation of updating BIOS or boot code on the non-volatile memory 139.

Figure 2:
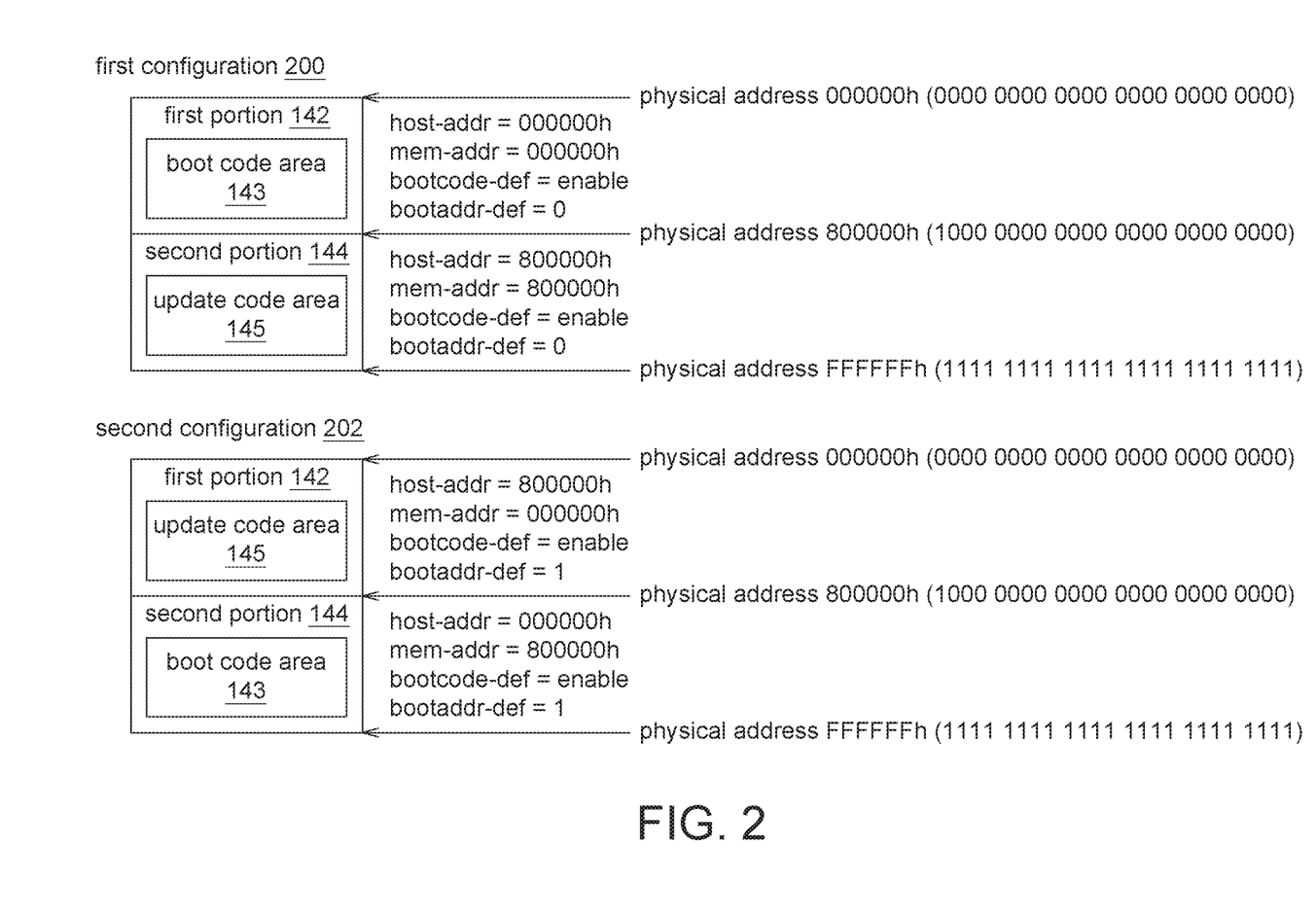
FIG. 2 provides a functional block diagram illustrating first and second configurations of first and second portions of a non-volatile memory of a memory device according to an exemplary embodiment of the application.

FIG. 2 provides a functional block diagram illustrating first and second configurations of first and second portions of a non-volatile memory of a memory device according to an exemplary embodiment of the application.

Specifically, FIG. 2 illustrates a first configuration 200 and a second configuration 202. According to the first configuration 200, the first portion 142 of the non-volatile memory 139 of FIG. 1 is configured to store data (e.g., boot code) to be read during, for example a "boot up" and where the second portion 144 of the non-volatile memory 139 is configured to have updated data (e.g., updated boot code) written thereto. In the example illustrated in FIG. 2, the first portion 142 and the second portion 144 can be configured to store BIOS or boot code. According to the first configuration 200, the first portion 142 contains a boot-code area 143 that stores the boot code (or said a primary boot code) that is used during the "boot up" and the second portion 144 contains an update code area 145 that is for having the updated boot code written thereto (or said, the boot code stored in the update code area 145 may be referred as a backup boot code). According to the second configuration 202, the first portion 142 contains the update code area 145 that is for having the updated boot code written thereto and the second portion 144 contains the boot-code area 143 that stores the boot code that is used during the "boot up". This is only an example implementation of the present technology and should not be limited to just BIOS or boot code.

In the example implementation illustrated in FIG. 2 with respect to the first configuration 200 and the second configuration 202, the starting address of the non-volatile memory 139 designated for the first portion 142 begins at physical address 000000h (hex) (i.e., 0000 0000 0000 0000 0000 0000 in binary) and the starting address of the non-volatile memory 139 designated for the second portion 144 begins at physical address 800000h (i.e., 1000 0000 0000 0000 0000 0000 in binary). The ending address for the first portion 142 can be physical address 7FFFFFh (i.e., 0111 1111 1111 1111 1111 1111 in binary); and the ending address for the second portion 144 can be physical address FFFFFFh (i.e., 1111 1111 1111 1111 1111 1111 in binary).

Further, according to the first configuration 200, when the host 110 performs a read operation to read, for example, boot code from the non-volatile memory 139, from address (the host address) 000000h it will be directed to physical address 000000h (that is, the boot code is read from the first portion 142). Also, according to the first configuration 200, when the host 110 performs a write operation to write, for example, updated boot code to the non-volatile memory 139, to address (the host address) 800000h it will be directed to physical address 800000h (that is, the updated boot code is written into the second portion 144).

Further, according to the second configuration 202, when the host 110 performs a read operation to read, for example, boot code from the non-volatile memory 139, from address (the host address) 000000h it will be directed to physical address 800000h (that is, the boot code is read from the second portion 144). Also, according to the second configuration 202, when the host 110 performs a write operation to write, for example, updated boot code to the non-volatile memory 139, to address (the host address) 800000h it will be directed to physical address 000000h (that is, the updated boot code is written into the first portion 142).

In both the first configuration 200 and the second configuration 202, when the host 110 reads the boot code, the host 110 sends the same host read address 000000h, the host 110 will be directed to different memory physical addresses; and when the host 110 writes the boot code, the host 110 sends the same host write address 800000h, the host 110 will be directed to different memory physical addresses.

FIG. 2 also illustrates that the variable bootcode-def (bit) indicates "enable." The bootcode-def can either indicate "enable" or "disable." When bootcode-def indicates "enable," the memory device 130 (FIG. 1) is in a dual-area update mode (e.g., "dual mode" for short) that allows the BIOS or boot code to be updated while continuing to use the current boot code. In other words, when the bootcode-def indicates "enable" the first configuration 200 and the second configuration 202 are both used for reading/writing data (boot code). If bootcode-def indicates "disable" then memory device 130 will operate in a conventional mode, meaning that neither the first configuration 200 nor the second configuration 202 will be used (i.e., the "dual mode" is disabled). In other words, the bootcode-def variable simply turns on and off the "dual-area update mode". Bootcode-def can be user configurable and the value of bootcode-def can be stored in a non-volatile memory register (not illustrated). The control circuitry 134 and the status logic 138 of FIG. 1 operate according to the value of bootcode-def. The nomenclature of "bootcode-def" is only an example and is for the purpose of indicating that a variable is used by the memory device 130 for determining whether or not to operate using conventional operations or to operate using the ping-ponging update operation. Any other naming convention could be used. The variable "bootcode-def" may be also referred as "dual-area update mode enable parameter".

Additionally, according to the first configuration 200, the variable bootaddr-def equals 0. This can represent that the first portion 142 and the second portion 144 are utilized according to the first configuration 200. In this example, when bootaddr-def equals 0 (i.e., the first configuration) the code (boot code) to be read during "boot up" is stored starting from the lowest address of the non-volatile memory 139 designated for the boot code. This first configuration can also indicate that the code is stored starting from the highest address of the non-volatile memory 139. The bootaddr-def can be user configurable and can be stored in a non-volatile memory register (not illustrated). The control circuitry 134 and the status logic 138 of FIG. 1 operate according to the value of bootaddr-def. Again, the nomenclature of "bootaddr-def" is only an example and is for the purpose of indicating which portion of the non-volatile memory 139 is designated for storing the current code to be read and which portion of the non-volatile memory 139 is designated for having the updated code written thereto. The variable "bootaddr-def" may be also referred as a "configuration selection parameter".

In the first configuration 200, when the host 110 attempts to read the current code from address 000000h (i.e., "host-addr=000000h") the memory device 130 reads the current code from physical address 000000h (i.e., "mem-addr=000000h") and when the host 110 attempts to write the updated code to address 800000h (i.e., "host-addr=800000h") the memory device 130 writes the updated code starting at address 800000h (i.e., "mem-addr=800000h").

According to the second configuration 202, the second portion 144 of the non-volatile memory 139 is configured to store the data (e.g., boot code) to be read during, for example, the "boot up" and the first portion 142 of the non-volatile memory 139 is configured to have the updated data (e.g., updated boot code) written thereto. Additionally, the second configuration 202 is implemented by the memory device 130 when "bootcode-def=enable" and when "bootaddr-def=1." Specifically, in the second configuration 202, the variable bootaddr-def equals 1, which can represent that the first portion 142 and the second portion 144 are utilized according to a second configuration. In this example, when bootaddr-def equals 1 (i.e., the second configuration) the code (boot code) to be read during "boot up" is stored starting at a physical address other than the lowest address of the non-volatile memory 139 (e.g., physical address 800000h, as opposed to physical address 000000h as in the first configuration 200).

As illustrated in FIG. 2, according to the second configuration 202, when the host 110 attempts to read the current code from address 000000h (i.e., "host-addr=000000h") the memory device 130 reads the current code from physical address 800000h (i.e., "mem-addr=800000h") and when the host 110 attempts to write the updated code to address 800000h (i.e., "host-addr=800000h") the memory device 130 writes the updated code starting at address 000000h (i.e., "mem-addr=000000h").

Furthermore, referring to FIG. 2, in the first configuration 200 the binary address of the beginning of the first portion 142 (the boot-code area 143) is 0000 0000 0000 0000 0000 0000 and in the second configuration 202 the binary address of the beginning of the second portion 144 (the boot-code area 143) is 1000 0000 0000 0000 0000 0000. Accordingly, the physical address of the boot-code area 143 can be changed, depending on the configuration being implemented, by simply flipping the most significant bit of the address. As described in more detail with reference to FIG. 3, the value assigned to the bootaddr-def can cause the control circuitry 134 and the status logic 138 to flip the most significant bit of the physical memory address so that the code is read from the appropriate area of the non-volatile memory 139, and so that the code is updated (written) to the appropriate area of the non-volatile memory 139.

Figure 3:
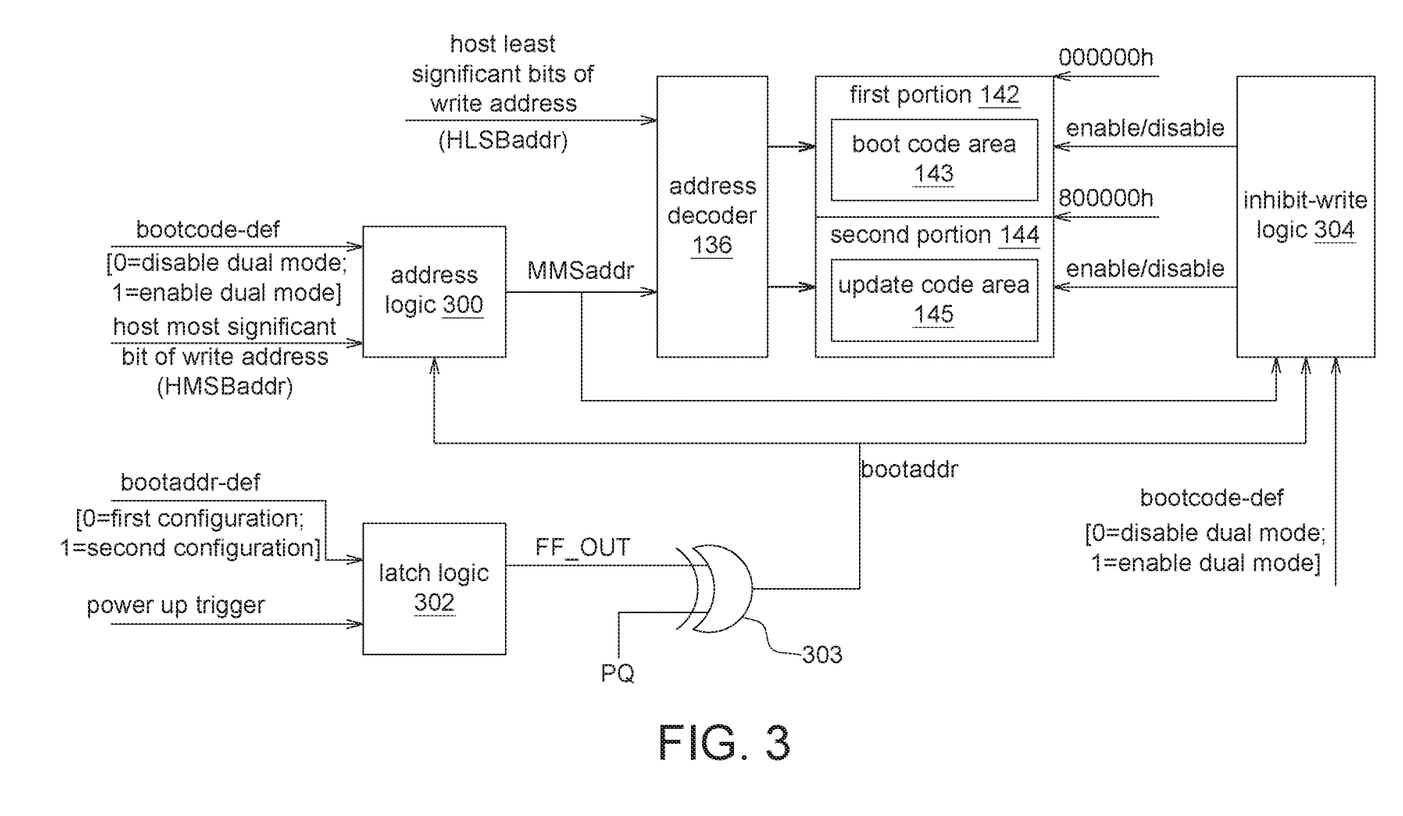
FIG. 3 illustrates a functional block diagram of portions of the electronic system of FIG. 1 according to an exemplary embodiment of the application.

FIG. 3 illustrates a functional block diagram of portions of the system of FIG. 1.

Specifically, FIG. 3 illustrates portions of the control circuitry 134, the address decoder 136 and the non-volatile memory 139 of the system 100 of FIG. 1. Referring to FIG. 3, the system 100 can include address logic 300, latch logic 302 and an EXOR logic 303. The address logic 300, the latch logic 302 and the EXOR logic 303 are part of the status logic 138 of the control circuitry 134, as illustrated in FIG. 1. The prequality flag PQ is stored in a volatile memory register of the control circuitry 134.

The value of bootaddr-def, which can be stored in a non-volatile memory register of the control circuitry 134, is received by the latch logic 302. As previously described, the variable bootaddr-def can indicate "1" or "0" which indicates that the system 100 operates using a first configuration or a second configuration. The first configuration can indicate that the first configuration 200 of FIG. 2 is implemented and the second configuration can indicate that the second configuration 202 of FIG. 2 is implemented.

The latch logic 302 also receives a power up trigger for generating an output FF_OUT every time the system 100 "boots up." When the latch logic 302 receives the power up trigger it sets the output FF_OUT to equal the value of bootaddr-def. However, the value of FF_OUT will not change until the system 100 reboots and the power up trigger causes the latch logic 302 to set FF_OUT to equal the value of bootaddr-def.

The output signal FF_OUT and the prequalify flag PQ are received by the EXOR logic 303 which outputs the variable bootaddr (also referred as "boot address parameter"). The variable bootaddr is input to the address logic 300 and the inhibit-write logic 304. The prequalify flag PQ has a default value of "0".

The address logic 300, as illustrated in FIG. 3, obtains the value of the variable bootcode-def as well as the most significant bit of a write address of a write command. The value of bootcode-def can be stored in a non-volatile memory register of the control circuitry 134. The variable bootcode-def is described above with reference to FIG. 2. Essentially, bootcode-def indicates whether "dual-area update mode" (i.e., dual mode) is enabled or disabled. If the "dual mode" is disabled, then the system 100 will operate in a conventional manner and if the "dual mode" is enabled, then the system 100 will operate using the two different configurations illustrated in FIG. 2. The value of bootcode-def can be "0" or "1." FIG. 3 illustrates that "0" means that dual mode is disabled and "1" means that dual mode is enabled. This is only an example and the meanings of the values can be switched.

The "host most significant bit of write address," (or host most significant bit of read address) as obtained by the address logic 300 is simply the most significant bit of a write address (or read address) identified by a host write (or read) command, wherein "host most significant bit of write address," (or host most significant bit of read address) may be referred as the host address host most significant bit. This is the most significant bit of the address that the host 110 is attempting to write to. In this example, FIG. 3 identifies the host most significant bit of write address as "HMSBaddr." The address logic 300 also receives the value of the bootaddr as determined by the latch logic 302 and the EXOR logic 303. The operation of the address logic 300 is described below.

When bootcode-def indicates disable (i.e. the dual-area update mode is disabled), (i) the variable "MMSaddr," as output by the address logic 300 equals HMSBaddr and (ii) the variables bootaddr and inhibit-write are ignored or provide no function. When bootcode-def indicates enable (i.e. the dual-area update mode is enabled), (i) the variable MMSaddr equals HMSBaddr, when bootaddr equals "0" and (ii) the variable MMSaddr is equal to the inverted value of HMSBaddr, when bootaddr equals "1". In other words, (i) the non-volatile memory 139 is utilized by the first configuration 200, when bootaddr equals "0" and (ii) the non-volatile memory 139 is utilized by the second configuration 202, when bootaddr equals "1".

The address decoder 136 receives the MMSaddr provided by the address logic 300 as well as the remaining portion of the host write address (i.e., "Host Least Significant Bits of Write Address" or "HLSBaddr"). The address decoder 136 then combines the MMSaddr with the HLSBaddr and then utilizes the map 137, as illustrated in FIG. 1, to identify which physical address of the non-volatile memory 139 should be accessed. For example, if the host 110 issues a write command to address 000000h (i.e., 0000 0000 0000 0000 0000 0000), when bootcode-def indicates enable and bootaddr indicates 1, the address decoder 136 will flip (invert) the most significant bit of the issued write command from "0" to "1" which is represented by MMSaddr and will then combine MMSaddr, which now has a value of "1", with the value of HLSBaddr, which has a value of "000 0000 0000 0000 0000 0000"). The resulting value is "1000 0000 0000 0000 0000 0000," which is then used by the map 137 to locate the corresponding physical address. On the other hand, if the host 110 issues a write command to address 000000h (i.e., 0000 0000 0000 0000 0000 0000), when bootcode-def indicates enable and bootaddr indicates 0, the address decoder 136 will combine MMSaddr, which now has a value of "0", with the value of HLSBaddr, which has a value of "000 0000 0000 0000 0000 0000"). The resulting value is "0000 0000 0000 0000 0000 0000," which is then used by the map 137 to locate the corresponding physical address.

In order to add a layer of security, inhibit-write logic 304 is implemented to prevent the boot-code area 143 from being overwritten or erased before the code on the update-code area 145 is completely updated and verified. The inhibit-write logic 304 receives (i) the bootaddr from the latch logic 302, (ii) the MMSaddr from the address logic 300 and (iii) the bootcode-def. Based on these inputs the inhibit-write logic 304 either enables or disables an inhibit-write for the boot-code area 143 and the update-code area 145.

The values of the variables bootaddr and inhibit-write are not user configurable, and can only be set by the system 100 or the logic thereof. Further, these values can be stored in volatile or non-volatile memory.

Figure 4:
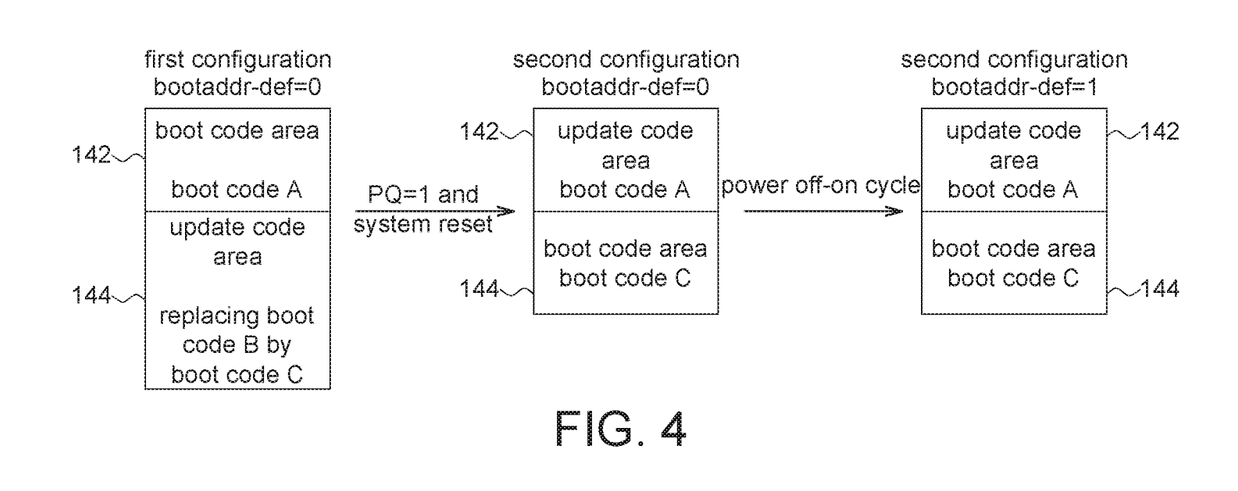
FIG. 4 and FIG. 5 illustrate a functional block diagram of a memory device that operates in a "dual-area update mode" according to an exemplary embodiment of the application.
Figure 5:
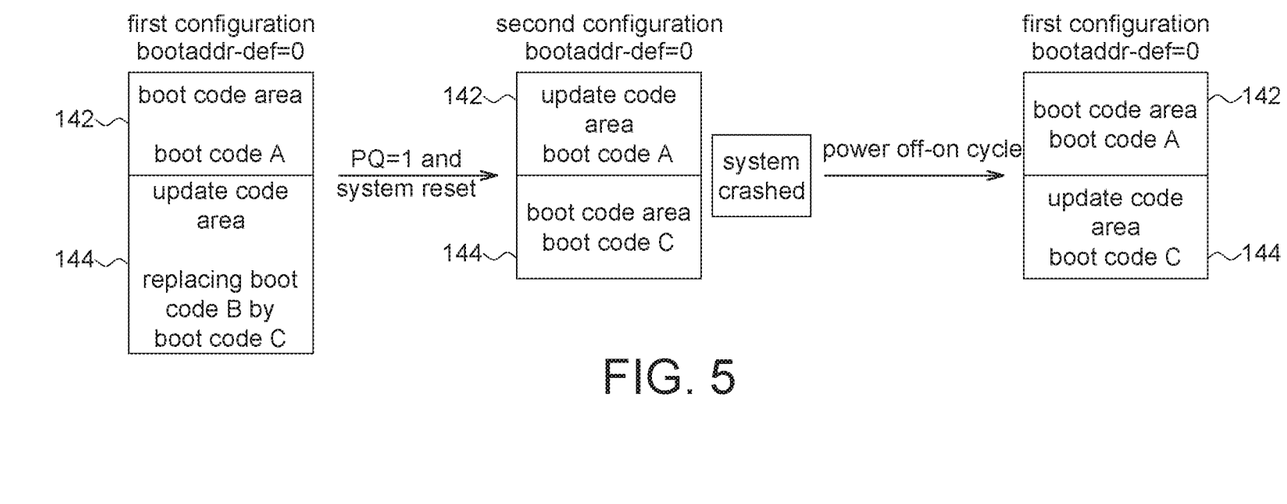

FIG. 4 and FIG. 5 illustrate a functional block diagram of a memory device that operates in a "dual-area update mode" according to an exemplary embodiment of the application. FIG. 4 and FIG. 5 are described in the example of the first configuration 200 and one skilled person will understand how to apply the application to the second configuration 202.

Refer to FIG. 3, FIG. 4 and FIG. 5. In the first configuration, the variable bootaddr-def=0. If an updated boot code is not written into the update code area 145, then the prequalify flag PQ is 0 (the default value). The variable bootaddr-def=0 and PQ=0, the EXOR logic 303 outputs the bootaddr=0. Meanwhile, the boot code (the code A) is read out from the first portion 142 and in updating the boot code, the updated boot code is written into the second portion 144. As described above, in the first configuration and the variable bootaddr=0, when the host attempts to read the boot code A by issuing a host read address 000000h, the memory device 130 reads the code A from the memory physical address 000000h ("mem-addr" is 000000h). When the host attempts to write the updated boot code C by issuing the host write address 800000h, the memory device 130 writes the updated boot code C from the physical memory address 800000h.

After, a code updating operation is performed. The inhibit-write on the second portion 144 is disabled and the backup boot code B is erased. A new (updated) boot code C is written into the second portion 144 and, the updated boot code C is protected (i.e. "inhibit-write" to the second portion 144 is enabled). If the updated boot code C is completed written into the second portion 144, in an embodiment of the application, the host 110 performs prequalification check on the updated boot code C, whose details are as follows.

When the host performs prequalification check on the updated boot code C, the host 110 enables the prequalify flag PQ as 1 and the host 110 sends a system reset command, wherein the system reset command cannot trigger a power off-on cycle (i.e. cannot trigger the power up signal) in order not to restore the prequalify flag PQ as 0. This is because the prequalify flag PQ is stored in an internal volatile memory register in the status logic 134. If the system reset command triggers a power off-on cycle, then the prequalify flag PQ is restored back 0 (the default value). PQ is changed from 0 to 1 and bootaddr-def=0, the EXOR logic 303 outputs the variable bootaddr=1 (from 0 to 1). Thus, when the host 110 attempts to read the boot code by issuing a host address 000000h (i.e. host-addr=000000h), the memory device 130 reads at the memory physical address 800000h (i.e. mem-addr=800000h). This is because the variable bootaddr input to the address logic is changed into 1 from 0. Thus, the address output from the address decoder 136 is 800000h. In other words, when bootaddr-def=0 and PQ=1, the memory device 130 reads out the updated boot code C from the second portion 144 to return to the host 110 as the primary boot code. In other words, in the embodiment, meanwhile, the second portion 144 is "temporarily" configured as the boot code area and the first portion 142 is "temporarily" configured as the update code area. Meanwhile, the configuration is changed from the first configuration into the second configuration but the host 110 does not change the variable bootaddr-def yet.

After the host 110 completes booting up by using the updated code C (i.e. the update code C is correct), the host 110 does change/invert the variable bootaddr-def (bootaddr-def=!bootaddr-def, for changing the variable bootaddr-def from 0 into 1). In the next power off-on cycle, the latch logic 302 latches the changed bootaddr-def (being "1") and the prequalify flag PQ is restored as 0 (because of the next power off-on cycle). Thus, the EXOR logic 303 output the variable bootaddr=1 which also means the configuration is successfully changed into the second configuration wherein the second portion is configured as the boot code area 143 and the first portion 142 is configured as the update code area 145. Afterward, the host 110 reads the boot code C as the primary booting code.

On the contrary, as shown in FIG. 5, if the host 110 does not complete booting by using the updated code C (i.e. the updated code C is wrong), the system 100 will be crashed or hang up. If so, the system 100 will not change the value of the variable bootaddr-def. In the next power off-on cycle, the latch logic 302 latch the variable bootaddr-def (being "0") and due to the power off-on cycle, the prequalify flag PQ is restored as 0. Thus, the EXOR logic 303 outputs bootaddr=0 which also means the configuration is restored as the first configuration from the temporary second configuration. Also, the second portion 144 is restored as the update code area 145 and the first portion 142 is restored as the boot code area 143. That is, the host 110 reads out the code A from the first portion 142 as the primary booting code.

In the exemplary embodiment of the disclosure, after the update code is written into the update code area, the configuration is temporarily changed by enabling the prequalify flag PQ. If the host 110 completes booting up by using the updated code, the configuration is fixed (the configuration is changed as: "first configuration"→"temporary second configuration"→"second configuration"). If the host 110 cannot boot up successfully by using the updated code, the configuration is restored as: "first configuration"→"temporary second configuration"→"first configuration").

In the embodiment, in updating the boot code, even if the update code C is wrong, via the prequalify implementation of the embodiment, the host 110 may check/prequalify the updated code C is correct or wrong without erasing the current primary boot code A. Thus, the system crashed or hang up may be prevented if even the wrong updated boot code is written.

Further, in order to achieve the features (prequalify) of the exemplary embodiment of the disclosure, the circuit and the control are not complicated. Thus, the exemplary embodiment of the disclosure has advantages such as low cost, easy control, easy implementation and zero risk in updating the booting code.

Figure 6:
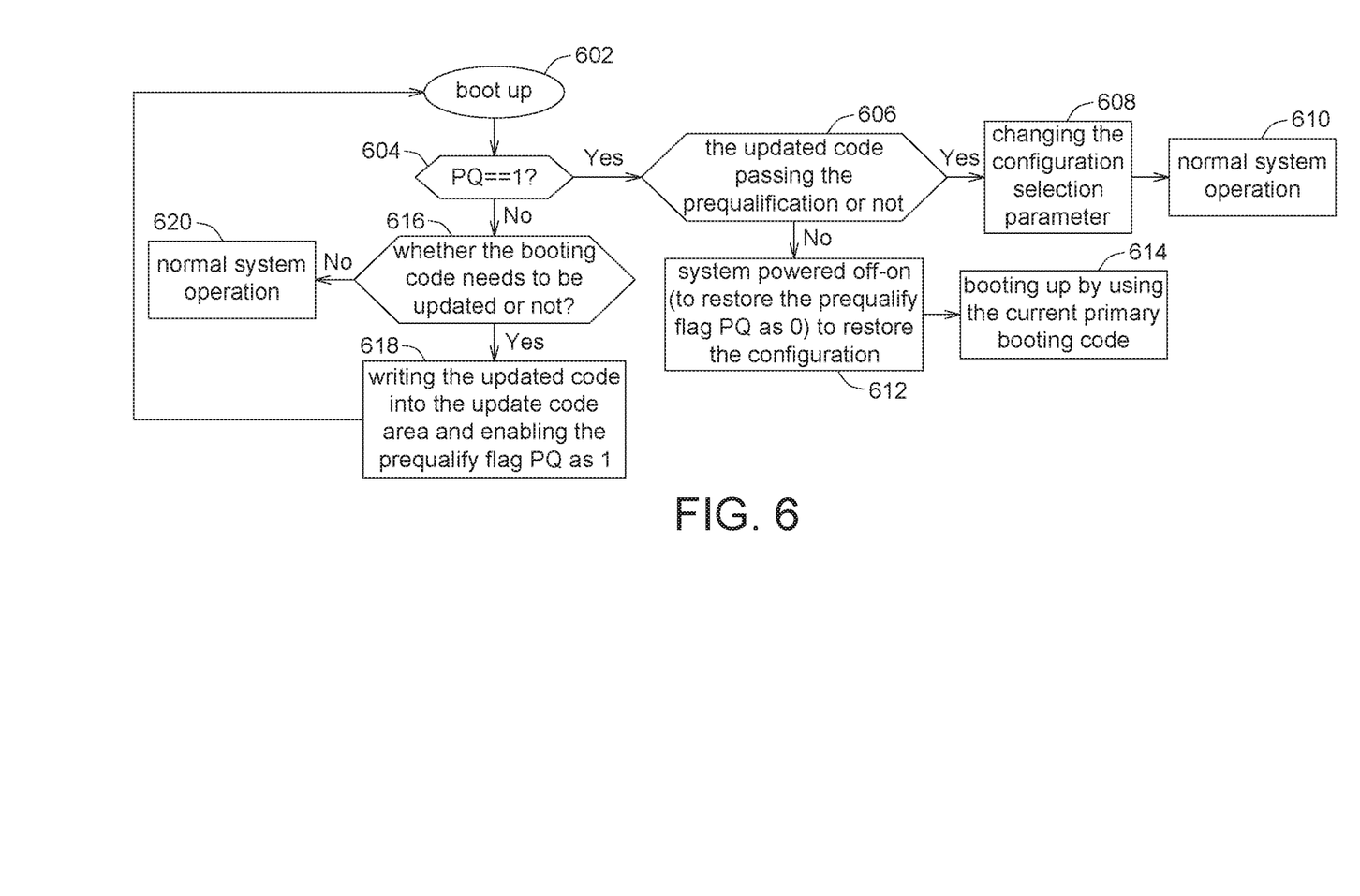
FIG. 6 illustrates flow charts exemplary embodiment of a method for managing system boot code memory when the system is operating in the "dual-area update mode" according to an exemplary embodiment of the application.

FIG. 6 illustrates flow charts exemplary embodiment of a method for managing system boot code memory when the system is operating in the "dual-area update mode" according to an exemplary embodiment of the application. In step 602, the system is booted up. In step 604, the host 110 checks whether the prequalify flag PQ is 1 or not. If the prequalify flag PQ is 1, in step 606, the host 110 checks whether the updated code pass the prequalification or not. If the updated code pass the prequalification, in step 608, the configuration selection parameter is changed (i.e. the host changes the value of the variable bootaddr-def) and thus in the next power up trigger signal, the configuration is changed from the first configuration 200 (the second configuration 202) as the second configuration 202 (the first configuration 200). In step 610, the normal system operation is performed.

If the updated code cannot pass the prequalification, in step 612, the host 110 will not change the value of the variable bootaddr-def and the system is powered off-on (to restore the prequalify flag PQ as 0) to restore the configuration. In step 614, the current primary booting code is used in booting up.

If the prequalify flag PQ is 0 in step 604, in step 616, the host checks whether the booting code needs to be updated or not. If the booting code needs to be updated, in step 618, the updated code is written into the update code area 145 and the prequalify flag PQ is enabled as 1 and the flow returns to step 602.

If the booting code does not need to be updated, in step 620, the normal system operation is performed.

In the disclosure, by prequalifying the updated code, the system crash or hang up is prevented. That is, before the updated booting code is configured as the primary booting code, the host performs prequalify on the updated booting code. In prequalify, the area having the updated booting code is temporarily configured as the boot code area and the area having the original primary booting code is temporarily configured as the update code area. If the host successfully completes booting up by using the updated boot code (that is the updated boot code is correct), the area having the updated booting code is configured as the boot code area and the area having the original primary booting code is configured as the update code area. On the contrary, if the host does not successfully complete booting up by using the updated boot code (that is the updated boot code is wrong), the area having the updated booting code is restored as the update code area and the area having the original primary booting code is restored as the boot code area (the system is booting up by using the original primary boot code).

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory device, comprising:
   a non-volatile memory configured by having a first portion and a second portion, wherein: the first portion is represented by a first range of physical addresses, the second portion is represented by a second range of physical addresses, the first portion and the second portion are utilized by a current configuration among a first configuration and a second configuration, a primary booting code is stored in one of the first portion and the second portion and a backup booting code is stored in the other of the first portion and the second portion;
   an address decoder coupled to the non-volatile memory, for mapping received command addresses to physical addresses of the non-volatile memory; and
   a control circuitry coupled to the address decoder,
   wherein in response that an updated booting code replaces the backup booting code, the updated booting code is performed by a prequalify operation, and the first portion and the second portion being temporarily utilized by another configuration, other than the current configuration, among the first configuration and the second configuration;
   if the updated booting code is operated successfully, after system reset, the first portion and the second portion being utilized by another configuration among the first configuration and the second configuration; and if the updated booting code is not operated successfully, after system power off-on cycle, the first portion and the second portion being utilized by the current configuration among the first configuration and the second configuration.

2. The memory device of claim 1, wherein the control circuitry includes:
a latch logic, for latching a configuration selection parameter in response to a power up trigger signal;
an EXOR logic, coupled to the latch logic, for receiving a prequalify flag and an output of the latch logic to generate a booting address parameter; and
an address logic, coupled to the EXOR logic, outputting an output variable to the address decoder based on the booting address parameter, a dual-area update mode enable parameter and a host address most significant bit.

3. The memory device of claim 2, wherein:
in response that the backup booting code is replaced by the updated booting code, the prequalify flag is enabled;
in response that the prequalify flag is enabled, the booting address parameter from the EXOR logic changes to change the output variable output from the address logic, the address decoder directs to a different memory address and the first portion and the second portion being temporarily utilized by another configuration among the first configuration and the second configuration.

4. The memory device of claim 3, wherein:
if the updated booting code is operated successfully, the configuration selection parameter is changed and thus the first portion and the second portion are utilized by another configuration among the first configuration and the second configuration.

5. The memory device of claim 3, wherein:
if the updated booting code is not operated successfully, the configuration selection parameter is kept and thus the first portion and the second portion are utilized by the current configuration among the first configuration and the second configuration.

6. The memory device of claim 2, wherein the prequalify flag is stored in an internal volatile memory register of the control circuitry.

7. A method for managing system boot code memory applied in a non-volatile memory configured by having a first portion and a second portion, the first portion is represented by a first range of physical addresses, the second portion is represented by a second range of physical addresses, the first portion and the second portion are utilized by a current configuration among a first configuration and a second configuration, a primary booting code is stored in one of the first portion and the second portion and a backup booting code is stored in the other of the first portion and the second portion, the method including:
in response that an updated booting code replaces the backup booting code, performing a prequalify operation on the updated booting code, wherein the first portion and the second portion being temporarily utilized by another configuration, other than the current configuration, among the first configuration and the second configuration;
if the updated booting code is operated successfully, after system reset, utilizing the first portion and the second portion by another configuration among the first configuration and the second configuration; and
if the updated booting code is not operated successfully, after system power off-on cycle, utilizing the first portion and the second portion by the current configuration among the first configuration and the second configuration.

8. The method of claim 7, further including:
latching a configuration selection parameter in response to a power up trigger signal by a latch logic;
receiving a prequalify flag and an output of the latch logic to generate a booting address parameter by an EXOR logic; and
outputting an output variable based on the booting address parameter, a dual-area update mode enable parameter and a host address most significant bit.

9. The method of claim 8, wherein:
in response that the backup booting code is replaced by the updated booting code, the prequalify flag is enabled;
in response that the prequalify flag is enabled, the booting address parameter and the output variable are changed to direct to a different memory address and thus the first portion and the second portion are temporarily utilized by another configuration among the first configuration and the second configuration.

10. The method of claim 9, wherein:
if the updated booting code is operated successfully, the configuration selection parameter is changed and thus the first portion and the second portion are utilized by another configuration among the first configuration and the second configuration.

11. The method of claim 9, wherein:
if the updated booting code is not operated successfully, the configuration selection parameter is kept and thus the first portion and the second portion are utilized by the current configuration among the first configuration and the second configuration.

12. The method of claim 8, wherein the prequalify flag is stored in an internal volatile memory register.

13. An electronic system, comprising:
a host; and
a memory device coupled to the host, the memory device including:
a non-volatile memory configured by having a first portion and a second portion, wherein: the first portion is represented by a first range of physical addresses, the second portion is represented by a second range of physical addresses, the first portion and the second portion are utilized by a current configuration among a first configuration and a second configuration, a primary booting code is stored in one of the first portion and the second portion and a backup booting code is stored in the other of the first portion and the second portion;
an address decoder coupled to the non-volatile memory, for mapping received command addresses to physical addresses of the non-volatile memory; and
a control circuitry coupled to the address decoder,
wherein in response that an updated booting code replaces the backup booting code, the updated booting code is performed by a prequalify operation, and the first portion and the second portion being temporarily utilized by another configuration, other than the current configuration, among the first configuration and the second configuration;
if the updated booting code is operated successfully, after system reset, the first portion and the second portion being utilized by another configuration among the first configuration and the second configuration; and if the updated booting code is not operated successfully, after system power off-on cycle, the first portion and the second portion being utilized by the current configuration among the first configuration and the second configuration.

14. The electronic system of claim 13, wherein the control circuitry includes:
   a latch logic, for latching a configuration selection parameter in response to a power up trigger signal;
   an EXOR logic, coupled to the latch logic, for receiving a prequalify flag and an output of the latch logic to generate a booting address parameter; and
   an address logic, coupled to the EXOR logic, outputting an output variable to the address decoder based on the booting address parameter, a dual-area update mode enable parameter and a host address most significant bit.

15. The electronic system of claim 14, wherein:
   in response that the backup booting code is replaced by the updated booting code, the prequalify flag is enabled;
   in response that the prequalify flag is enabled, the booting address parameter from the EXOR logic changes to change the output variable output from the address logic, the address decoder directs to a different memory address and the first portion and the second portion being temporarily utilized by another configuration among the first configuration and the second configuration.

16. The electronic system of claim 15, wherein:
   if the updated booting code is operated successfully, the configuration selection parameter is changed and thus the first portion and the second portion are utilized by another configuration among the first configuration and the second configuration.

17. The electronic system of claim 15, wherein:
   if the updated booting code is not operated successfully, the configuration selection parameter is kept and thus the first portion and the second portion are utilized by the current configuration among the first configuration and the second configuration.

18. The electronic system of claim 14, wherein the prequalify flag is stored in an internal volatile memory register of the control circuitry.

* * * * *